United States Patent
Slik et al.

(10) Patent No.: US 9,766,811 B1
(45) Date of Patent: Sep. 19, 2017

(54) FLASH-BASED STORAGE WAREHOUSE APPARATUSES AND METHODS THEREOF

(71) Applicant: NetApp, Inc., Sunnyvale, CA (US)

(72) Inventors: David Slik, Northridge, CA (US); Peter Corbett, Lexington, MA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 15/143,270

(22) Filed: Apr. 29, 2016

(51) Int. Cl.
*G06F 3/06* (2006.01)
*B65G 1/06* (2006.01)

(52) U.S. Cl.
CPC ............ *G06F 3/0605* (2013.01); *B65G 1/06* (2013.01); *G06F 3/0611* (2013.01); *G06F 3/0616* (2013.01); *G06F 3/0626* (2013.01); *G06F 3/0658* (2013.01); *G06F 3/0659* (2013.01); *G06F 3/0686* (2013.01); *G06F 3/0688* (2013.01)

(58) Field of Classification Search
CPC .... G06F 3/0605; G06F 3/0611; G06F 3/0616; G06F 3/0626; G06F 3/0658; G06F 3/0659; G06F 3/0686; G06F 3/0688; B65G 1/06
USPC .............. 711/103, 4, 5, 112, 154, 158, 170; 369/30.06; 710/5; 365/185.33; 700/245; 901/8, 14, 36; 318/568.11
See application file for complete search history.

(56) References Cited

U.S. PATENT DOCUMENTS

| | | | | |
|---|---|---|---|---|
| 6,123,259 A * | 9/2000 | Ogasawara | ........ | G06K 17/0022 235/380 |
| 6,386,450 B1 * | 5/2002 | Ogasawara | ........ | G06K 17/0022 235/380 |
| 6,543,052 B1 * | 4/2003 | Ogasawara | ............ | G06Q 30/06 348/734 |
| 6,976,623 B1 * | 12/2005 | Mambakkam | ........ | G06F 3/0605 235/441 |
| 7,822,687 B2 * | 10/2010 | Brillon | ............... | G06Q 30/0603 369/30.06 |
| 8,156,163 B1 * | 4/2012 | Hamilton | ............ | H04L 67/1097 707/812 |
| 8,261,033 B1 * | 9/2012 | Slik | ......................... | G06F 3/067 711/111 |
| 9,015,286 B2 * | 4/2015 | Nathan | ................ | G11B 19/025 455/426.1 |
| 9,015,287 B2 * | 4/2015 | Nathan | ................ | G11B 19/025 455/426.1 |

(Continued)

*Primary Examiner* — Stephen Elmore
(74) *Attorney, Agent, or Firm* — LeClairRyan, a Professional Corporation

(57) ABSTRACT

A flash-based storage warehouse system includes flash memory devices and reader/writer devices that are moveable to different locations in a structure. Each of the flash memory devices are at one of the different locations in the structure. Each of the reader/writer devices includes a locomotion apparatus configured to move the corresponding one of the reader/writer devices to a different location in the structure and a processor coupled to a memory and the locomotion apparatus that is configured to execute machine executable code to: engage the locomotion apparatus to adjustably position one of reader/writer devices to one of the locations in the structure in response to a received operation; couple power via the corresponding one of the reader/writer devices to one of the flash memory devices at the one of the locations in the structure; and execute the operation on the flash memory device at the location in the structure.

20 Claims, 3 Drawing Sheets

(56) References Cited

U.S. PATENT DOCUMENTS

| | | | | |
|---|---|---|---|---|
| 9,076,155 B2* | 7/2015 | Dion | ..................... | G06Q 10/10 |
| 9,164,661 B2* | 10/2015 | Nathan | ................ | G11B 19/025 |
| 9,202,209 B2* | 12/2015 | Nathan | ................ | G11B 19/025 |
| 9,292,166 B2* | 3/2016 | Rivera | ................ | G06F 3/04817 |
| 9,436,356 B2* | 9/2016 | Nathan | ................ | G11B 19/025 |
| 9,513,774 B2* | 12/2016 | Nathan | ................ | G11B 19/025 |
| 9,521,375 B2* | 12/2016 | Beaumier | ............. | G07F 11/002 |

* cited by examiner

US 9,766,811 B1

FLASH-BASED STORAGE WAREHOUSE APPARATUSES AND METHODS THEREOF

FIELD

This technology relates to data storage networks and, more particularly, to flash-based storage warehouse systems and methods thereof.

BACKGROUND

Traditional tape libraries use a robot to move tape cartridges from shelves within a library to one or more tape drives when requested. At that point, the data stored on the tape cartridges can be linearly read since tape is a linear medium.

Unfortunately, tape cartridges have latency and wear limitations and thus are not ideal for the quick and efficient retrieval of data as this reduces the value for long term storage use. Additionally, these traditional tape libraries with robots can be expensive to set up and operate. In particular, they often require precise mechanical engineering to setup and maintain.

DETAILED DESCRIPTION

Figure 1:
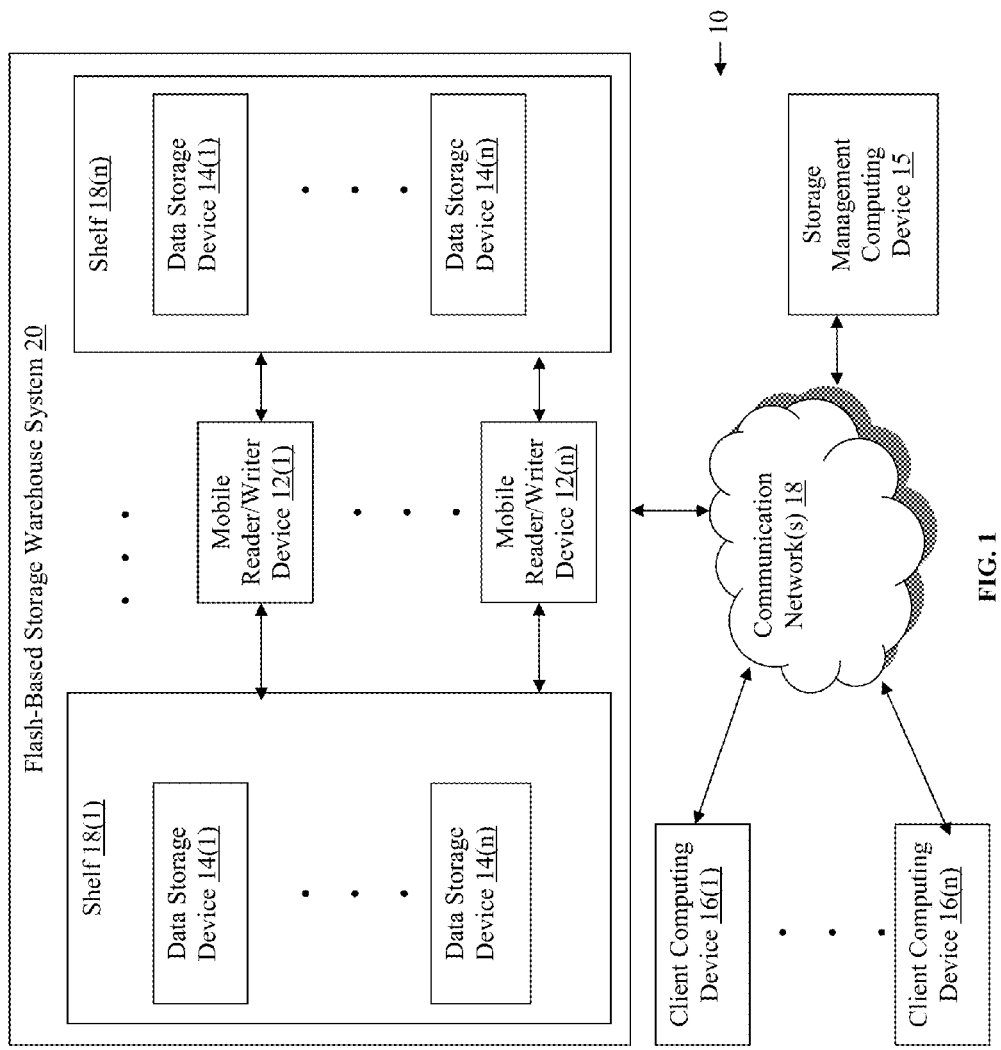
FIG. 1 is a block diagram of an environment with an example of a flash-based storage warehouse system.
Figure 2A:
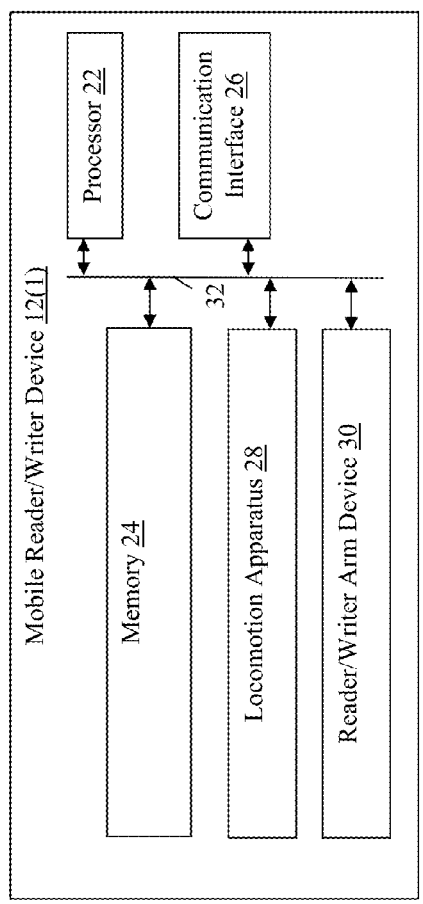
FIG. 2A is a block diagram of an example of a mobile reader/writer device.
Figure 2B:
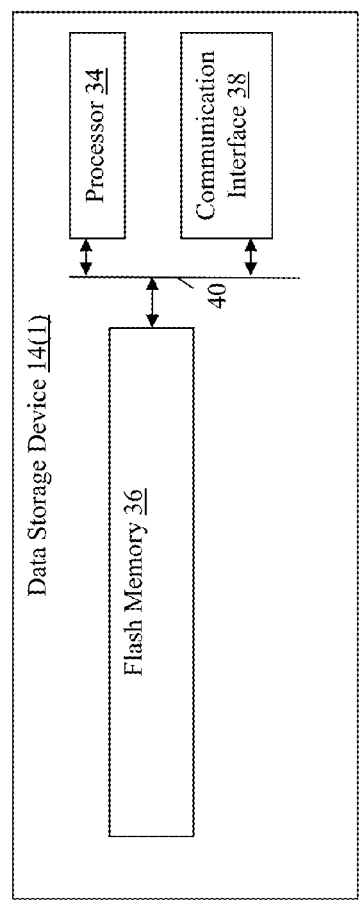
FIG. 2B is a block diagram of an example of a flash memory device.
Figure 3:
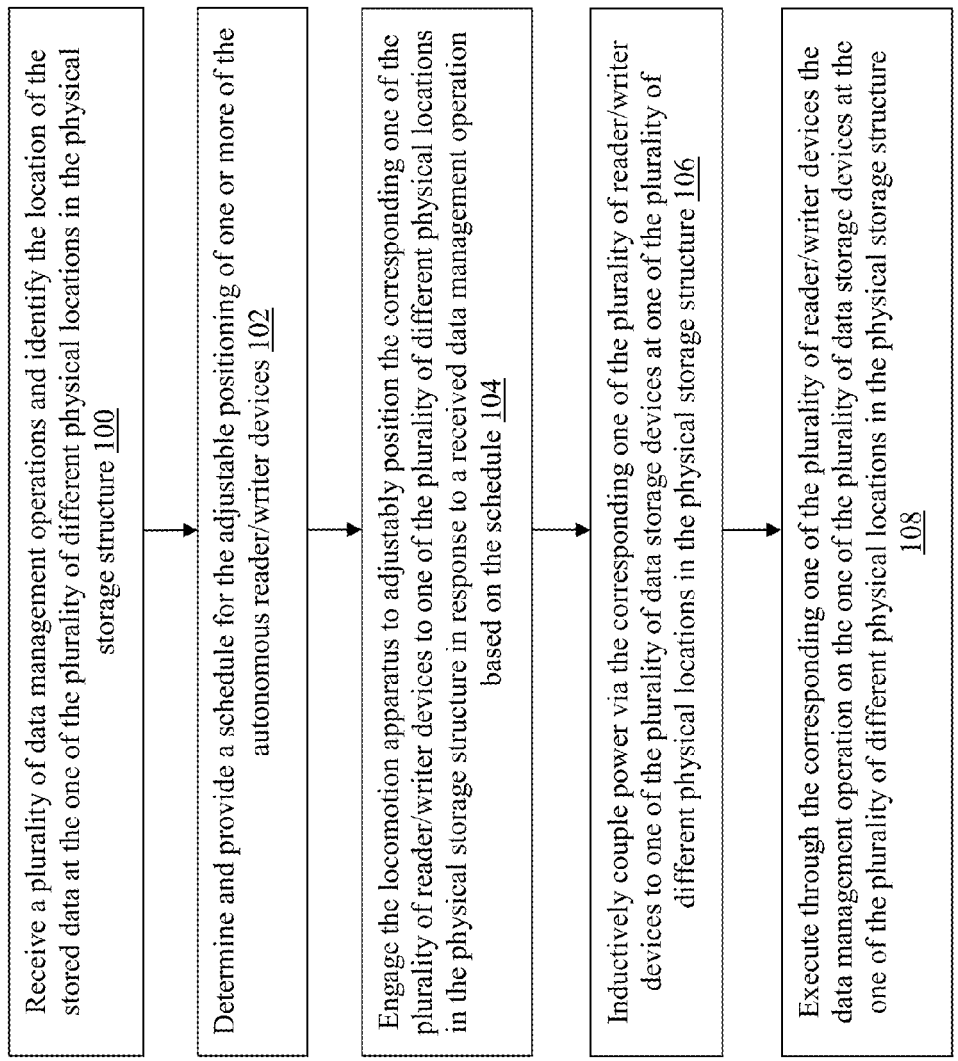
FIG. 3 is a flowchart of an example of a method for operating a flash-based storage data warehouse.

A network environment 10 with an example of a flash-based storage warehouse system 20 is illustrated in FIGS. 1-3. In this particular example, the environment 10 includes the flash-based storage warehouse system 20 with a plurality of mobile reader/writer devices 12(1)-12(n) and shelves 18(1)-18(n) each with a plurality of data storage devices 14(1)-14(n), a storage management computing device 15, and client computing devices 16(1)-16(n), although the environment 10 could include other types and/or numbers of other systems, devices, components, and/or other elements in other configurations. Additionally, the network environment 10 may include other network devices, such as one or more routers and/or switches, for example, which are well known in the art and thus will not be described herein. This technology provides a number of advantages including providing an efficient and effective automated flash-based storage warehouse system. A portion (or all) of the network environment 10 can be located on a company's or other entities premises and/or in one or more data centers providing public, private and/or hybrid cloud comprising infrastructure, platform, and software products or services.

Referring to FIG. 2A, a block diagram of one of the mobile reader/writer device 12(1) is illustrated. In this particular example, the other mobile reader/writer devices 12(2)-12(n) have the same elements, structure, and operation, although each could comprise other types and/or numbers of components, and/or other elements in other configurations. In this particular example, the mobile reader/writer device 12(1) may comprise an autonomous robot device with processor(s) 22, a memory 24, a communication interface 26, a locomotion apparatus 28, and a reader/writer arm device 30 which are coupled together by a bus 32 or other communication link.

The processor(s) 22 of the mobile reader/writer device 12(1) may execute a program of stored instructions for one or more aspects of this technology, as described and illustrated by way of the embodiments herein, although the processor(s) 22 could execute other numbers and types of programmed instructions. The processor(s) 22 in of the mobile reader/writer device 12(1) may include one or more central processing units (CPUs) or general purpose processors with one or more processing cores, for example. The memory 24 of the mobile reader/writer device 12(1) may include any of various forms of read only memory (ROM), random access memory (RAM), flash memory, non-volatile or volatile memory, or the like, or a combination of such devices, for example.

The communication interface 26 of the mobile reader/writer device 12(1) can include one or more network interface controllers (NICs) for operatively coupling and communicating wirelessly or by hard wire connections between the mobile reader/writer device 12(1) and the storage management computing device 15 and/or one or more of the client computing devices 16(1)-16(n), which are coupled together via one or more communication networks 18, although other types and/or numbers of communication networks or systems with other types and/or numbers of connections and configurations to other devices and elements also can be used.

By way of example only, the communication network(s) 16 can use TCP/IP over Ethernet and industry-standard protocols, including NFS, CIFS, SOAP, XML, LDAP, and SNMP, although other types and/or numbers of communication networks, can be used. The communication network(s) 16 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 16 may also comprise any local area network and/or wide area network (e.g., Internet), although any other type of traffic network topologies may be used.

The locomotion apparatus 28 in the mobile reader/writer device 12(1) have components and/or other elements configured to physically move the mobile reader/writer device 12(1) to one of a plurality of locations within a set perimeter about the shelves 18(1)-18(n) which each have a plurality of data storage devices 16(1)-16(n) in response to positioning commands from the processor(s) 22, although other types and/or numbers of locomotion apparatuses could be used.

The reader/writer arm device 30 in the mobile reader/writer device 12(1) is an adjustable electro-mechanical arm configured to extend out to and couple to one of the plurality of data storage devices 16(1)-16(n) in response to commands from the processor(s) 22, although other types and/or numbers of locomotion apparatuses could be used, including fixed arms that are positioned by locomotion apparatus 28.

In this particular example, each of the data storage devices 14(1)-14(n) are solid state drives comprising flash memory and collectively comprise an all flash array, although other types of data storage devices could be used. Each of the data storage devices 14(1)-14(n) may manage one or more elements of stored data based on one or more received management commands, receive one or elements of new data and one or more storage commands via an I/O channel for storage, and/or retrieve and send one or more other elements of the stored data based on or more request commands via the I/O channel, although other types and/or numbers of operations may be executed.

Referring more specifically to FIG. 2B, a block diagram of one of the data storage device 14(1) is illustrated. In this particular example, the other data storage devices 14(2)-14(n) have the same elements, structure, and operation, although each could comprise other types and/or numbers of components, and/or other elements in other configurations. Additionally in this particular example, the data storage device 14(1) may comprise processor(s) 34, flash memory 36, and a communication interface 38 which are coupled together by a bus 40 or other communication link.

The processor(s) 34 of the data storage device 14(1) may execute a program of stored instructions for one or more aspects of this technology, as described and illustrated by way of the examples herein, although the processor(s) 34 could execute other numbers and types of programmed instructions. The processor(s) 34 in of the data storage device 14(1) may include one or more central processing units (CPUs) or general purpose processors with one or more processing cores, for example. The memory 36 of the data storage device 14(1) is a flash memory, although other forms of read only memory (ROM), random access memory (RAM), non-volatile or volatile memory, or the like, or a combination of such devices, for example, could be used.

The communication interface 38 of the data storage device 14(1) can operatively couple and communicate wirelessly or by hard wire connections with the mobile reader/writer device 12(1) to the storage management computing device 15 and/or one or more of the client computing devices 16(1)-16(n) via one or more communication networks 18, although other types and/or numbers of communication networks or systems with other types and/or numbers of connections and configurations to other devices and elements also can be used.

Referring back to FIG. 1 the storage management computing device 15 includes a processor, a memory, a communication interface, and optionally an input device and a display device, which are coupled together by a bus or other link, although the storage management computing device 15 can have other types and/or numbers of components or other elements and other numbers and types of network devices could be used. The storage management computing device 15 may interface between and manage data operations between one or more of the client computing devices 16(1)-16(n) and one or more of the mobile reader/writer devices 12(1)-12(n) including determining a schedule for data operations for one or more of the mobile reader/writer devices 12(1)-12(n) based on received requests and one or more factors, such as the priority of the requests and/or particular location of the data in the data storage devices 14(1)-14(n).

Each of the client computing devices 16(1)-16(n) in this example includes a processor, a memory, a communication interface, and optionally an input device and a display device, which are coupled together by a bus or other link, although each of the client computing devices 16(1)-16(n) can have other types and/or numbers of components or other elements and other numbers and types of network devices could be used. The client computing devices 16(1)-16(n) may run interface applications that provide an interface to make requests for and send content and/or data to the storage node computing device 12 via the communication network(s) 16, for example. Each of the client computing devices 16(1)-16(n) may be a conventional personal computer, a tablet computing device, a smart phone, a virtual machine running in a cloud, an application server hosting applications that utilize backend storage, or other processing and/or computing device, for example.

The physical storage structure 20 defines an outer periphery and has one or more shelves 18(1)-18(n) which each may have one or more data storage devices 14(1)-14(n) at different physical locations on each of the shelves 18(1)-18(n), although other types and/or numbers of structures, shelves, and/or memory devices in other configurations may be used.

Although examples of the mobile reader/writer devices 12(1)-12(n), data storage devices 14(1)-14(n) on shelves 18(1)-18(n) in the physical storage structure 20, storage management computing device 15, and client computing devices 16(1)-16(n) are described and illustrated herein, it is to be understood that the devices and systems of the examples described herein are for exemplary purposes, as many variations of the specific electronics, mechanical systems, hardware and/or software are used to implement the examples are possible, as will be appreciated by those skilled in the relevant art(s). In addition, two or more computing systems or devices may be substituted for any one of the computing systems or devices in any of the examples.

The instruction(s), steps(s), and/or actions(s) of this technology as illustrated and/or described by way of the examples herein can be implemented as module or components of an application. Additionally, these instruction(s), steps(s), and/or actions(s) can be implemented as operating system extensions, modules, plugins, or the like. Further, these instruction(s), steps(s), and/or actions(s) may be operative in a cloud-based computing environment. These instruction(s), steps(s), and/or actions(s) also can be executed within virtual machine(s) or virtual server(s) that may be managed in a cloud-based computing environment. Also, these instruction(s), steps(s), and/or actions(s), including one or more whole or parts of the storage management computing device 15 and client computing devices 16(1)-16(n) themselves, may be located in virtual server(s) running in a cloud-based computing environment rather than being tied to one or more specific physical network computing devices. Further, these instruction(s), steps(s), and/or actions(s) may be running in one or more virtual machines (VMs) executing on one or more of the mobile reader/writer devices 12(1)-12(n), data storage devices 14(1)-14(n), storage management computing device 15, and client computing devices 16(1)-16(n).

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

An example of a method for operating a flash-based storage data warehouse will now be described with reference to FIGS. 1-3. Referring more specifically to FIG. 3, in step 100 one or more requests for data management operations, such as a read or a write of data to one of the data storage devices 14(1)-14(n) on one of the shelves 18(1)-18(n) in the physical storage structure 20, from one or more of the client computing devices 16(1)-16(n) may be received by the storage management computing device 15, although these requests could be received and processed by other devices, such as one or more of the mobile reader/writer devices 12(1)-12(n). In this example the storage management computing device 15 may identify the particular physical location for the data related to each of the requests at one or more of the data storage devices 14(1)-14(n) on one of the shelves 18(1)-18(n).

In step 102, the storage management computing device 15 determines a schedule for the adjustable positioning of one or more of the mobile reader/writer devices 12(1)-12(n) to service each of these requests, although the schedule could be determined by other devices, such as one or more of the mobile reader/writer devices 12(1)-12(n). By way of example, the schedule for processing each of the requests by one or more of the mobile reader/writer devices 12(1)-12(n) may be determined based on factors, such as priority of the request, a remaining worklist from a prior schedule, and/or location of the mobile reader/writer devices 12(1)-12(n), although other types and/or numbers of factors may be considered.

In step 104, the storage management computing device 15 provides the determined schedule to one or more of the mobile reader/writer devices 12(1)-12(n). Based on the schedule received by each of the mobile reader/writer devices 12(1)-12(n), the corresponding locomotion apparatus 28 may be engaged to adjustably position the corresponding one of the plurality of reader/writer devices 12(1)-12(n) to one of the plurality of different physical locations within the perimeter of the physical storage structure 20 for the responsive one of the data storage devices 14(1)-14(n) on one of the shelves 18(1)-18(n).

In step 106, the corresponding one of the reader/writer arm device 30 of each of the plurality of reader/writer devices 12(1)-12(n) executing a received schedule is extend to a position to couple with the responsive one of the data storage devices 14(1)-14(n) on one of the shelves 18(1)-18(n). Next, once in position the corresponding one of the reader/writer arm devices 30 of each of the plurality of reader/writer devices 12(1)-12(n) inductively couple power to the responsive one of the data storage devices 14(1)-14(n) on one of the shelves 18(1)-18(n).

In step 108, once power has been provided, the corresponding one of the reader/writer arm devices 30 of each of the plurality of reader/writer devices 12(1)-12(n) may wirelessly interact with the responsive one of the data storage devices 14(1)-14(n) on one of the shelves 18(1)-18(n) to execute the data management operation, such as a read of stored data or a write of data for storage using short-range wireless by way of example only, although other types of connections, such as wired connection could be used As illustrated and described by way of the examples herein, this technology provides an efficient and effective automated flash-based storage warehouse system. Example of this technology provide a new architecture for cold storage warehouses that involves rooms or other structures with shelves with flash memory cartridges on these shelves. To read or write data, the flash memory cartridges do not move, but instead autonomous reader/writer devices or other robots with extendable arms are positioned in proximity of a particular flash memory cartridge, power is inductively coupled to the flash memory cartridge, and short-range wireless to read/write data. By inductively coupling power transfer and using high-throughput wireless data transfer, the prior need to relocate a storage cartridge to the tape drive is eliminated which significantly reduces costs and complexity.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A flash-based storage warehouse system comprising:
a plurality of flash memory devices, each of the plurality of flash memory devices at one of a plurality of different physical locations in a physical storage structure and each comprising:
 a memory containing machine readable medium comprising machine executable code having stored thereon instructions for performing a method of management of data storage; and
 a processor coupled to the memory, the processor configured to execute the machine executable code to cause the processor to:
  manage one or more elements of stored data on one or more of the plurality of flash memory devices based on one or more received management commands;
  receive one or elements of new data and one or more storage commands via an I/O channel for storage on one or more of the plurality of flash memory devices; or
  retrieve and send one or more other elements of the stored data based on or more request commands via the I/O channel from one or more of the plurality of flash memory devices;
a plurality of reader/writer devices that are physically moveable to each of the plurality of different physical locations in the physical storage structure, each of the reader/writer devices comprising:
 a locomotion apparatus configured to physically move the corresponding one of the plurality of reader/writer devices to one or more of the different physical locations in the physical storage structure when engaged;
 a memory containing machine readable medium comprising machine executable code having stored thereon instructions for performing a method of transfer of stored data and commands; and
 a processor coupled to the memory and the locomotion apparatus, the processor configured to execute the machine executable code to cause the processor to:
  engage the locomotion apparatus to adjustably position the corresponding one of the plurality of reader/writer devices to one of the plurality of different physical locations in the physical storage structure in response to a received data management operation;
  couple power via the corresponding one of the plurality of reader/writer devices to one of the plurality of flash memory devices at the one of the plurality of different physical locations in the physical storage structure; and
  execute through the corresponding one of the plurality of reader/writer devices the data management operation on the one of the plurality of flash memory devices at the one of the plurality of different physical locations in the physical storage structure.

2. The system of claim 1 wherein at least one of the reader/writer devices further comprises:
an autonomous robot device that is moveable with respect to the physical storage structure when engaged; and
a reader/writer arm device coupled to the autonomous robot device and that is moveable to each of the plurality of different physical locations at the physical storage structure.

3. The system of claim 2 wherein the autonomous robot device movement is further configured to be moveable without constraints within a set periphery about the physical storage structure when engaged.

4. The system of claim 2 wherein the corresponding one of the reader/writer devices when positioned at the one of the plurality of different physical locations of the physical storage structure is further configured when enabled to inductively couple electrical power to the one of the plurality of flash memory devices.

5. The system of claim 2 wherein the corresponding one of the reader/writer devices when the data management operation is executed on the one of the plurality of flash memory devices positioned at the one of the plurality of different physical locations of the physical storage structure is further configured to execute without a physical connection the data management operation on the one of the plurality of flash memory devices.

6. The system of claim 5 wherein the corresponding one of the reader/writer devices is further configured when enabled to execute without the physical connection the data management operation to the one of the plurality of flash memory devices using short-range wireless data transfer.

7. The system of claim 2, wherein the processor of each of the reader/writer devices is further configured to execute the machine executable code to further cause the processor to:
identify for the received data management operation the one of the plurality of different physical locations for the responsive one of the plurality of flash memory devices in the physical storage structure;
adjustably position the autonomous robot device with respect to the physical storage structure based on the identified one of the plurality of different physical locations; and
adjustably position the reader/writer arm device to the identified one of the plurality of different physical locations of the physical storage structure to permit the coupling of the power and the execution of the data management operation.

8. The system as set forth in claim 6 wherein the processor of each of the reader/writer devices is further configured to execute the machine executable code to further cause the processor to:
receive a schedule based on one or more factors for the adjustable positioning of one or more of the autonomous robot devices and of the adjustable positioning of the one or more of the reader/writer arm devices based on identified ones of the plurality of different physical locations for a plurality of received data management operations.

9. The system as set forth in claim 8 wherein the one or more factors comprise one or more of a priority of each of the received data management operations, a current schedule, or a current physical location of the one or more autonomous robot devices.

10. The system as set forth in claim 1 wherein the physical storage structure further comprises one or more physical shelves for the physical storage of the plurality of flash memory devices.

11. A method for making a flash-based storage warehouse system, the method comprising:
providing a plurality of flash memory devices, each of the plurality of flash memory devices at one of a plurality of different physical locations in a physical storage structure and each comprising:
a memory containing machine readable medium comprising machine executable code having stored thereon instructions for performing a method of management of data storage; and
a processor coupled to the memory, the processor configured to execute the machine executable code to cause the processor to:
manage one or more elements of stored data on one or more of the plurality of flash memory devices based on one or more received management commands;
receive one or elements of new data and one or more storage commands via an I/O channel for storage on one or more of the plurality of flash memory devices; or
retrieve and send one or more other elements of the stored data based on or more request commands via the I/O channel from one or more of the plurality of flash memory devices;
providing a plurality of reader/writer devices that are physically moveable to each of the plurality of different physical locations in the physical storage structure, each of the reader/writer devices comprising:
a locomotion apparatus configured to physically move the corresponding one of the plurality of reader/writer devices to one or more of the different physical locations in the physical storage structure when engaged;
a memory containing machine readable medium comprising machine executable code having stored thereon instructions for performing a method of transfer of stored data and commands; and
a processor coupled to the memory and the locomotion apparatus, the processor configured to execute the machine executable code to cause the processor to:
engage the locomotion apparatus to adjustably position the corresponding one of the plurality of reader/writer devices to one of the plurality of different physical locations in the physical storage structure in response to a received data management operation;
couple power via the corresponding one of the plurality of reader/writer devices to one of the plurality of flash memory devices at the one of the plurality of different physical locations in the physical storage structure; and
execute through the corresponding one of the plurality of reader/writer devices the data management operation on the one of the plurality of flash memory devices at the one of the plurality of different physical locations in the physical storage structure.

12. The method of claim 11 wherein the providing the plurality of reader/writer devices further comprises providing the plurality of reader/writer devices wherein at least one of the reader/writer devices further comprises:

providing an autonomous robot device that is moveable with respect to the physical storage structure when engaged; and coupling a reader/writer arm device to the autonomous robot device and that is moveable to each of the plurality of different physical locations at the physical storage structure.

13. The method of claim 12 wherein the providing the autonomous robot device movement further comprises providing the autonomous robot device that is further configured to be moveable without constraints within a set periphery about the physical storage structure when engaged.

14. The method of claim 12 wherein the corresponding one of the reader/writer devices when positioned at the one of the plurality of different physical locations of the physical storage structure is further configured when enabled to inductively couple electrical power to the one of the plurality of flash memory devices.

15. The method of claim 12 wherein the corresponding one of the reader/writer devices when the data management operation is executed on the one of the plurality of flash memory devices positioned at the one of the plurality of different physical locations of the physical storage structure is further configured to execute without a physical connection the data management operation on the one of the plurality of flash memory devices.

16. The method of claim 15 wherein the corresponding one of the reader/writer devices is further configured when enabled to execute without the physical connection the data management operation to the one of the plurality of flash memory devices using short-range wireless data transfer.

17. The method of claim 12, wherein the processor of each of the reader/writer devices is further configured to execute the machine executable code to further cause the processor to:

identify for the received data management operation the one of the plurality of different physical locations for the responsive one of the plurality of flash memory devices in the physical storage structure;

adjustably position the autonomous robot device with respect to the physical storage structure based on the identified one of the plurality of different physical locations; and adjustably position the reader/writer arm device to the identified one of the plurality of different physical locations of the physical storage structure to permit the coupling of the power and the execution of the data management operation.

18. The method as set forth in claim 16 wherein the processor of each of the reader/writer devices is further configured to execute the machine executable code to further cause the processor to:

receive a schedule based on one or more factors for the adjustable positioning of one or more of the autonomous robot devices and of the adjustable positioning of the one or more of the reader/writer arm devices based on identified ones of the plurality of different physical locations for a plurality of received data management operations.

19. The method as set forth in claim 18 wherein the one or more factors comprise one or more of a priority of each of the received data management operations, a current schedule, or a current physical location of the one or more autonomous robot devices.

20. The method as set forth in claim 11 wherein the physical storage structure further comprises one or more physical shelves for the physical storage of the plurality of flash memory devices.

\* \* \* \* \*